Figure 4:
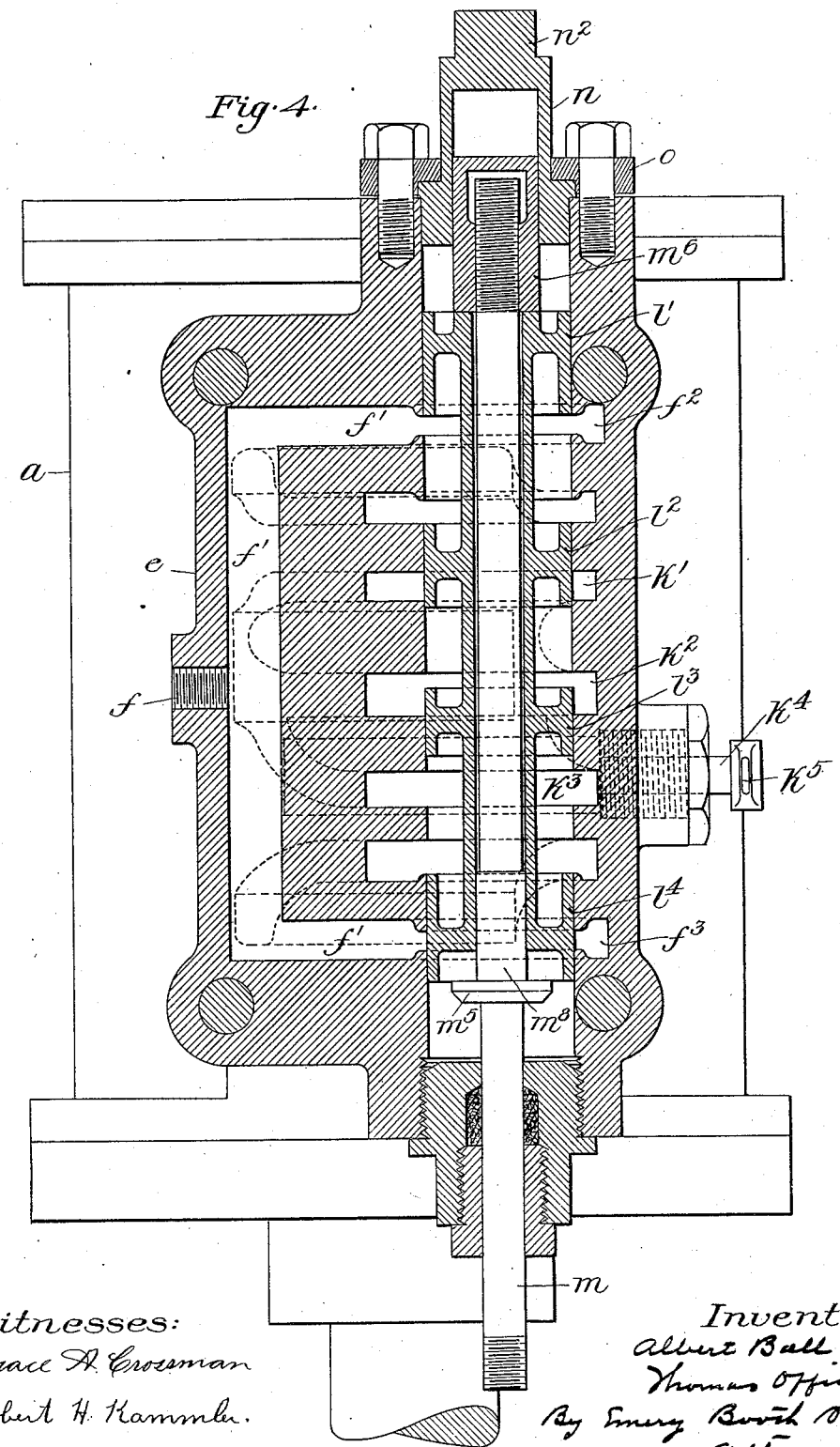

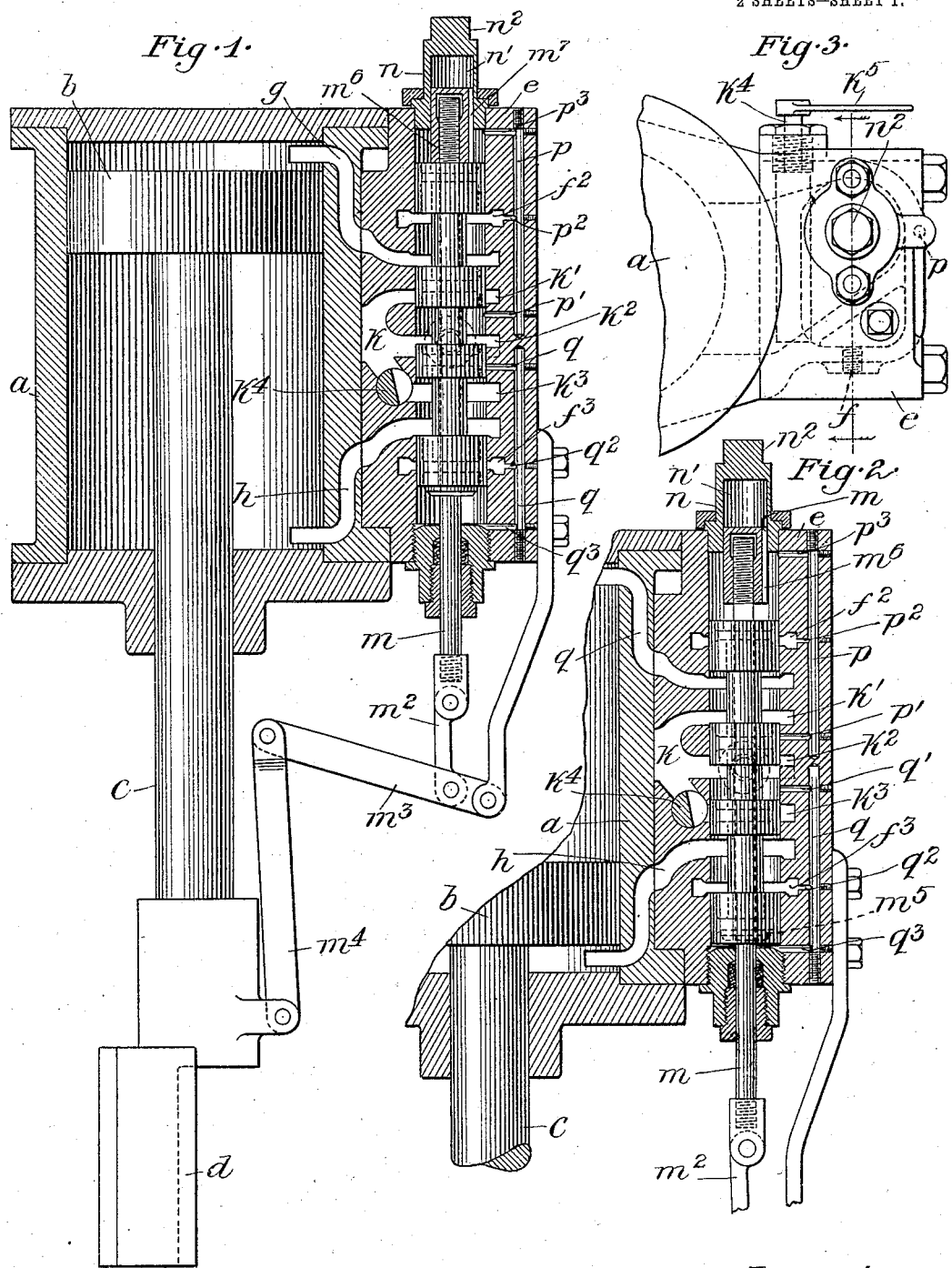

No. 842,129. PATENTED JAN. 22, 1907.
A. BALL & T. OFFICER.
PRESSURE ACTUATED VALVE FOR ENGINES.
APPLICATION FILED OCT. 30, 1905.

2 SHEETS—SHEET 2.

Witnesses:
Horace A. Crossman
Robert H. Kammler

Inventor:
Albert Ball and
Thomas Officer
By Emery Booth Powell
Attorneys

UNITED STATES PATENT OFFICE.

ALBERT BALL AND THOMAS OFFICER, OF CLAREMONT, NEW HAMPSHIRE, ASSIGNORS TO SULLIVAN MACHINERY COMPANY, OF CLAREMONT, NEW HAMPSHIRE, A CORPORATION OF MAINE.

PRESSURE-ACTUATED VALVE FOR ENGINES.

No. 842,129.     Specification of Letters Patent.     Patented Jan. 22, 1907.

Application filed October 30, 1905. Serial No. 284,992.

*To all whom it may concern:*

Be it known that we, ALBERT BALL and THOMAS OFFICER, citizens of the United States, residing at Claremont, in the county of Sullivan and State of New Hampshire, have invented an Improvement in Pressure-Actuated Valves for Engines, of which the following description, in connection with the accompanying drawings, is a specification, like letters on the drawings representing like parts.

Our invention relates to engines, and more particularly, though not exclusively, to direct-acting fluid-pressure engines—such, for example, as are used for operating drills or other reciprocating tools.

While not limited in its application to engines used for any one purpose, our invention is capable of advantageous use with stone-channeling machines, and we have herein illustrated its principles by showing one form thereof embodied in a machine of that nature.

In a channeling-machine the tool or tools are directly attached to the piston-rod and are reciprocated at a high speed, striking the stone a series of powerful and rapidly-repeated blows. To get the speed desired and at the same time the requisite power, it is necessary to have a rapid admission of pressure on reversing movement of the valve. To obtain a quick valve-reversing movement, there is usually provided a main piston-valve thrown toward its reversing position by the pressure-control of an auxiliary valve, the latter operated by the piston movement and often through a reducing motion from the cross-head. The movement communicated to the auxiliary valve from the cross-head is such that at the appropriate time in the piston travel the auxiliary valve is caused to admit pressure to or exhaust it from one end of the main valve, this acting instantly to reverse the same.

Our present invention provides means for obtaining a quick reversing action of the main valve without the necessity of an auxiliary reverse-valve. The valve while controlled primarily by the piston movement is also subject to a pressure-control which on initial movement of the valve acts quickly to advance the latter toward its reverse position.

Our invention will be best understood by reference to the following description when taken in connection with the accompanying illustration of one specific embodiment thereof, while its scope will be more particularly pointed out in the appended claims.

In the drawings, Figure 1 is a vertical sectional view, partially broken away, showing one form of our invention applied to a channeling-engine. Fig. 2 is a similar view showing the valve and the piston, respectively, in different positions from those in Fig. 1. Fig. 3 is a plan view of the steam-chest and cylinder partially broken away. Fig. 4 is a vertical sectional view, on an enlarged scale, taken through the piston-valve and the steam-chest and showing the construction of the valve and its attached parts.

Referring to the drawings, and particularly to Figs. 1 and 2 thereof, there is shown, for the sake of illustrating the principles of my invention, a direct-acting engine of the type which is ordinarily employed upon channeling-machines. The medium usually employed in this type of engine is steam, but so far as our invention is concerned either steam or other gas under pressure may be used and engines of widely-different types from that shown may be employed. The framework of the engine having no material connection with our invention is for that reason omitted, but in practice the engine-cylinder $a$ will be supported to permit a vertical reciprocation of the piston $b$ and the piston-rod $c$, the latter carrying the cross-head $d$, sliding in suitable ways upon the framework. (Not shown.) The steam-chest $e$, containing the piston-controlling valve, is suitably secured to one side of the cylinder and has the threaded supply-opening $f$, (see Figs. 3 and 4,) adapted to be connected in any suitable way with a source of pressure-supply. (Not shown.) The supply-opening $f$ is connected, Fig. 4, by the divided passage $f'$ with the upper inlet-port $f^2$ and the lower inlet-port $f^3$, the former in one position of the valve, Fig. 1, serving to admit pressure through the head-end cylinder-port $g$ to the head end of the cylinder, and the latter in the reverse position of the valve, Fig. 2, serving to admit pressure through the tool-end cylinder-port $h$ to the tool end thereof. The steam-chest, Fig. 3, is also provided with the exhaust-passage $k$, which communicates with the valve-chamber through the upper exhaust-port $k'$, the intermediate exhaust-port $k^2$, and the lower exhaust-port $k^3$. In one position of the valve (shown in Fig. 2) the head-end port $g$ is opened to the exhaust through the upper exhaust-port $k'$, and in the reverse position of the valve (shown in Fig. 1) the tool-end port $h$ is opened to the exhaust through the lower exhaust-port $k^3$. In the passage, Figs. 1 and 2, leading from the lower exhaust-port $k^3$ to the exhaust-passage $k$ there is provided a valve or gate $k^4$, which may be turned by means of the handle $k^5$, Fig. 3, to change the available cross-sectional area of the passage, and thereby more or less to throttle the exhaust at the tool end of the cylinder; but inasmuch as this forms no part of our invention further reference thereto is unnecessary.

The valve $l$ is of the piston type, having four spools or piston-bodies $l'$, $l^2$, $l^3$, and $l^4$ and provided with a centrally-bored sleeve through which passes the valve-spindle $m$, which assists partially to control the valve. The spindle is connected for vertical reciprocation with the piston, and for that purpose the end thereof is extended through a suitable stuffing-box at the bottom of the valve-chamber. The projecting spindle end, Fig. 1, is there jointed by the connection $m^2$ to the pivoted link $m^3$, which latter is joined to the reciprocating cross-head of the engine by the link $m^4$, these several members constituting, in effect, a reducing-gear for suitably reducing the movement transmitted from the cross-head to the spindle. Within the valve-chamber at one end, (see Fig. 4,) and herein the lower end, the valve-stem is provided with a collar $m^5$, adapted to abut against one end of the valve, and at the other with the adjustable nut $m^6$, adapted to abut against the opposite valve end. Between these two abutments $m^5$ and $m^6$ the valve may be freely moved under the influence of the controlling pressure which for that purpose is employed, as hereinafter described. The nut $m^6$ is adjustably threaded on the end of the spindle, so that the play allowed the valve between the two abutments may be increased or diminished at will. During the reciprocation of the piston the nut slides within the bushing $n$, the latter having a groove $n'$, Figs. 1 and 2, to receive the key $m^7$ upon the nut, preventing the latter from turning and impairing the adjustment. The bushing $n$, however, has the hexagonal head $n^2$, and when freed from the clamping-collar $o$ may be freely turned to adjust the nut lengthwise the spindle. When the desired adjustment has been effected, the clamping-collar $o$, by means of the clamping-bolts shown, is screwed down against the neck or shoulder upon the bushing and effectively retains the latter in fixed position. On movement of the piston the consequent and corresponding movement of the valve-spindle gives initial movement to the valve by the engagement therewith of one or the other of the two abutments. At an early stage of this piston-actuated valve movement pressure means are brought into operation to throw the valve forward to the limit of its free movement upon the spindle, this quick throw of the valve to its reverse position being sufficient to admit full pressure at once to the opposite end of the piston. For the pressure-actuation of the valve there are provided the upper auxiliary pressure-passage $p$ and the lower auxiliary passage $q$. The former has the port $p'$, which in one position of the valve opens to the intermediate exhaust-port, also the port $p^2$, opening to the upper inlet-port $f^2$, and the port $p^3$, communicating with a pressure-chamber formed between the upper end of the piston-valve and the inner end of the bushing $n$. The lower auxiliary pressure-port $q$ likewise has a port $q'$, which in one position of the valve is placed in communication with the intermediate exhaust-port, the port $q^2$ communicating with the lower inlet-port, and the port $q^3$ communicating with a pressure-chamber formed between the lower end of the valve and the stuffing-box. The two opposite pressure-chambers are prevented from communicating with each other through the central bore of the valve-sleeve by means of the enlargement $m^8$ upon the valve-stem adjacent the collar $m^5$, which thereat has a snugly-sliding fit within the valve-sleeve.

A more detailed operation of the described form of the valve is as follows: Assuming the piston to be just starting on its downward stroke, as shown in Fig. 1, the valve in the position shown is held against the abutting nut $m^6$ by pressure at the opposite end of the valve in the lower pressure-chamber, the said pressure being maintained through the ports $q^3$, lower auxiliary pressure-port $q$, port $q^2$, and lower inlet-port $f^3$. The pressure is relieved in the pressure-chamber at the upper end of the valve, since the upper auxiliary pressure-port $p$ is then in communication with the exhaust through the port $p'$. As the piston moves downwardly the spindle also moves downwardly, carrying the valve with it by engagement of the abutting nut therewith. As soon as the valve moves far enough to uncover the port $q'$ and close the port $p'$ the pressure is relieved in the lower valve-chamber through the connection made with the exhaust and is admitted to the upper valve-chamber, with the effect of instantly throwing the valve forward or downward with the lower valve end against the abutting collar $m^5$. This movement of the valve is sufficient to shut off the head-end cylinder-port $g$ from the inlet-port $f^2$ and open it to the exhaust, and at the same time to shut off the tool-end port $h$ from the exhaust and open it to the inlet-port $f^3$ by an amount which rapidly increases as the valve travels farther downward, the latter continuing to be held against the descending abutting collar $m^5$ by the pressure at its upper end. When the piston reaches the lower end of the cylinder, its momentum is overcome by the delivery of the blow, and the piston and valve parts assume the position shown in Fig. 2. The pressure is being admitted to the tool end of the cylinder through the port $h$ and is being exhausted at the head end through the port $g$. The valve is then moved upward with the ascending piston by the abutting collar $m^5$ on the spindle until the port $p'$ is opened, thereby releasing the pressure at the upper pressure-chamber and the port $q'$ closed, thereby raising the pressure at the lower pressure-chamber. This causes the valve to be advanced on its spindle up and against the abutting nut $m^6$, this advanced movement of the valve sufficing to connect the port $h$ with the exhaust and the port $g$ with the upper inlet-port $f^2$, the valve being held against the abutting nut by the pressure in the lower chamber until after the upward limit of stroke is reached and the downward stroke begun.

The amount of pressure-controlled travel of the valve relative to its spindle can be increased or diminished by adjusting the nut $m^6$ to vary the distance between the two abutments. The more play allowed the valve upon the stem by increasing this distance the quicker will the piston be reversed by incoming pressure on throw of the valve, so that a considerable range of travel may be given the piston in the cylinder by the mere adjustment of the nut $m^6$ and without altering the movement or travel of the valve-stem. This adjustment of the nut $m^6$ may be made while the machine is running, and the operator can then readily see the effects of the adjustment and secure the nut and bushing in fixed position by the clamping-collar when the desired result is reached.

While we have illustrated and explained the principles of our invention by reference to one specific embodiment thereof, which for illustrative purposes we have shown in detail, the invention is not limited to the details or form or arrangement of parts herein shown, but these may be widely departed from without departing from the spirit of our invention.

We claim—

1. A direct-acting engine having a piston, a valve, a reciprocating actuator positively connected to said piston to be moved therewith at a proportionate rate, said actuator being loosely connected to said valve to move the same on initial movement of the piston, and pressure means controlled by initial valve movement to advance said valve relatively to the actuator, and place the same in position to be moved thereby at the beginning of the return movement thereof.

2. A direct-acting engine having a piston, a valve, a reciprocating actuator loosely connected to the valve, positively-connected means for reciprocating said actuator through movement of the piston to give initial movement to the valve and pressure means controlled by initial valve movement quickly to advance the valve for reversal of the engine and to move the valve relatively to the actuator, thereby leaving it in relation thereto to be moved by the actuator on initial reverse piston movement.

3. An engine having a piston, a valve, positively-connected means between the valve and the piston initially to move the valve at the beginning of the piston-stroke and in response to piston movement and pressure means brought into operation on initial valve movement quickly to advance the valve for reversal of the piston.

4. An engine having a piston-valve, positively-connected means between the valve and the piston initially to move the valve in response to piston movement, pressure means controlled by the initial valve movement quickly to advance the valve for reversal of the piston and means for varying the extent of the pressure-actuated valve movement.

5. A direct-acting engine having a main valve, a reciprocating actuator loosely connected to the valve, means for reciprocating said actuator through movement of the piston to give initial movement to the valve, pressure positively-connected means controlled by the initial valve movement quickly to advance the valve for reversal of the engine and to move the valve relatively to the actuator, thereby leaving it in position to be initially moved by the actuator on reverse movement thereof, and means to vary the extent of the pressure-actuated valve movement relatively to the actuator.

6. An engine having a piston, a reciprocating valve, a valve-actuator, said actuator having two abutments adapted for engagement one or the other with said valve, said valve being adapted for relative movement between said abutments, positively-connected means to reciprocate said actuator from and with the piston, thereby initially to move said valve by engagement between the same and one of the said abutments, pressure means controlled on the initial valve movement to advance the valve relatively to the actuator and throw the same against the other abutment to reverse the engine, said valve being thereby placed in relation to said actuator to be moved reversely on reverse movement thereof.

7. An engine having a piston, a reciprocating valve, a valve-actuator, said actuator having two abutments adapted for engagement one or the other with said valve, said valve being adapted for relative movement between said abutments, connecting means to reciprocate said actuator from and with the piston, thereby initially to move said valve by engagement between the same and one of the said abutments, pressure means controlled on the initial valve movement to advance the valve relatively to the actuator and throw the same against the other abutment to reverse the engine, said valve being thereby placed in relation to said actuator to be moved reversely on reverse movement thereof, and means for adjusting one of said abutments lengthwise the actuator to vary the movement of the valve relatively thereto.

8. A direct-acting engine having a cylinder, a piston, a piston-rod, a piston-valve controlling the admission of pressure to and exhaust from said cylinder, a valve-stem passing loosely through said piston-valve and at the outside of the valve-chamber connected to be moved with and by said piston-rod, an abutment upon said valve-stem at each end of said piston-valve and adapted each for engagement therewith but permitting relative movement between the valve and the stem, piston-heads at each end of said piston-valve provided in conjunction with the valve-chamber, pressure-chambers at each end thereof, an auxiliary pressure-port opening into each pressure-chamber, said ports each having passages adapted to be connected either with the exhaust or with the pressure, said passages being so controlled by the valve movement produced by engagement between the valve and an abutment upon the stem as to raise the pressure in one chamber and lower it in the opposite chamber, thereby to advance the valve relatively to and upon the stem.

9. An engine having a piston, a valve controlling the same, a reciprocating actuator moving said valve, abutments upon said actuator between which said valve has relative movement, one of said abutments having threaded adjustment upon said actuator and means exterior to the valve-chamber for adjusting the position of said abutments upon said actuator.

10. An engine having a piston-valve, connecting means between the valve and the piston initially to move the valve in response to piston movement, pressure means controlled by the initial valve movement quickly to advance the valve for reversal of the piston and means for varying the extent of the pressure-actuated valve movement while the engine is running.

11. A direct-acting engine having a cylinder, a piston, a piston-rod adapted for direct attachment to a tool, a valve controlling said engine, a reciprocating valve-actuator loosely connected to the valve, a reducing mechanism positively connecting said actuator to said piston-rod to cause the same to reciprocate at a proportionate rate with said piston, pressure means also for controlling said valve, said valve being actuated partly by said actuator and partly by said pressure-controlling means.

12. An engine having a piston, a reciprocating valve, a valve-stem positively connected for reciprocation with and from the piston, a valve loosely mounted on said valve-stem, abutments between said valve and stem for causing initial movement of the valve, and pressure means controlled by initial valve movement quickly to advance said valve relatively to the stem.

13. An engine having a piston, a reciprocating valve, a valve-stem to which said valve is loosely connected, abutments between said valve and valve-stem permitting relative movement between the same, positively-connected piston-operated means therefor, pressure-chambers in which said valve is movable, pressure-passages controlled by the initial movement of the valve for admitting or exhausting pressure from said chambers to permit pressure-actuated movement of said valve upon said stem.

14. An engine having a cylinder, a piston, a piston-rod, a piston-valve controlling the admission of pressure to and exhausting it from said cylinder, piston-heads at each end of said piston-valve, pressure-chambers in which said ends operate, pressure-ports opening into said pressure-chambers and controlled by initial movement of the valve, an actuator loosely connected to permit relative movement of the valve, said actuator being positively connected to said piston to move the valve and thereby admit pressure to or exhaust the same from said pressure-chambers to advance the valve relatively to the actuator.

15. An engine having a piston, a valve controlling the same, the reciprocating actuator moving said valve, abutments upon said actuator between which said valve has relative movement and means exterior to the valve-chamber for adjusting the relative position of said abutments.

In testimony whereof we have signed our names to this specification in the presence of two subscribing witnesses.

ALBERT BALL.
    THOMAS OFFICER.

Witnesses:
 JAMES A. BRUCE,
 DAVID P. FLETCHER.